United States Patent

[11] 3,633,902

| [72] | Inventor | Dale S. Worden<br>Salt Lake City, Utah |
|---|---|---|
| [21] | Appl. No. | 46,927 |
| [22] | Filed | June 17, 1970 |
| [45] | Patented | Jan. 11, 1972 |
| [73] | Assignee | Sperry Rand Corporation<br>New York, N.Y. |

[54] AIR-BEARING WHEEL ACCELERATOR FOR DOCUMENT-HANDLING APPARATUS
2 Claims, 3 Drawing Figs.

| [52] | U.S. Cl. | 271/51 |
|---|---|---|
| [51] | Int. Cl. | B65h 5/06 |
| [50] | Field of Search | 271/74, 80, 51, 26 |

[56] References Cited
UNITED STATES PATENTS

| 2,819,075 | 1/1958 | Noon | 271/26 |
|---|---|---|---|
| 2,948,381 | 8/1960 | Penn | 271/74 X |

FOREIGN PATENTS

| 827,893 | 2/1960 | Great Britain | 271/26 |
|---|---|---|---|

*Primary Examiner*—Edward A. Sroka
*Attorneys*—Kenneth T. Grace, Thomas J. Nikolai and John P. Dority

ABSTRACT: A soft periphery tire mounted on a fixed axle is suspended off a document track by jets of air. A document passing between the tire and the air jets is accelerated by the rotating tire while suspended from the document track by the air jets.

PATENTED JAN 11 1972  3,633,902
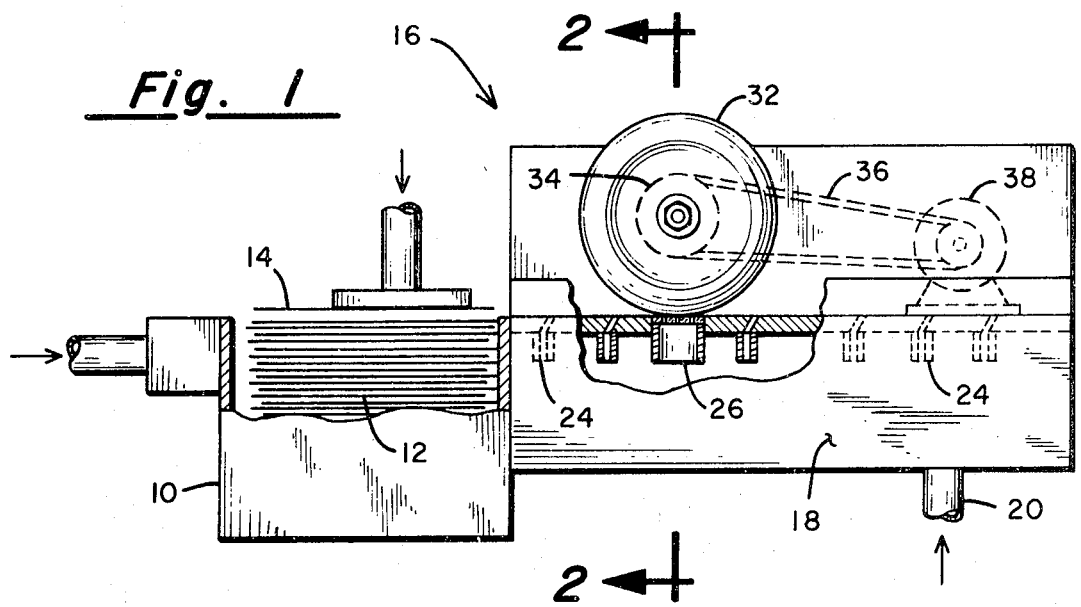
Fig. 1
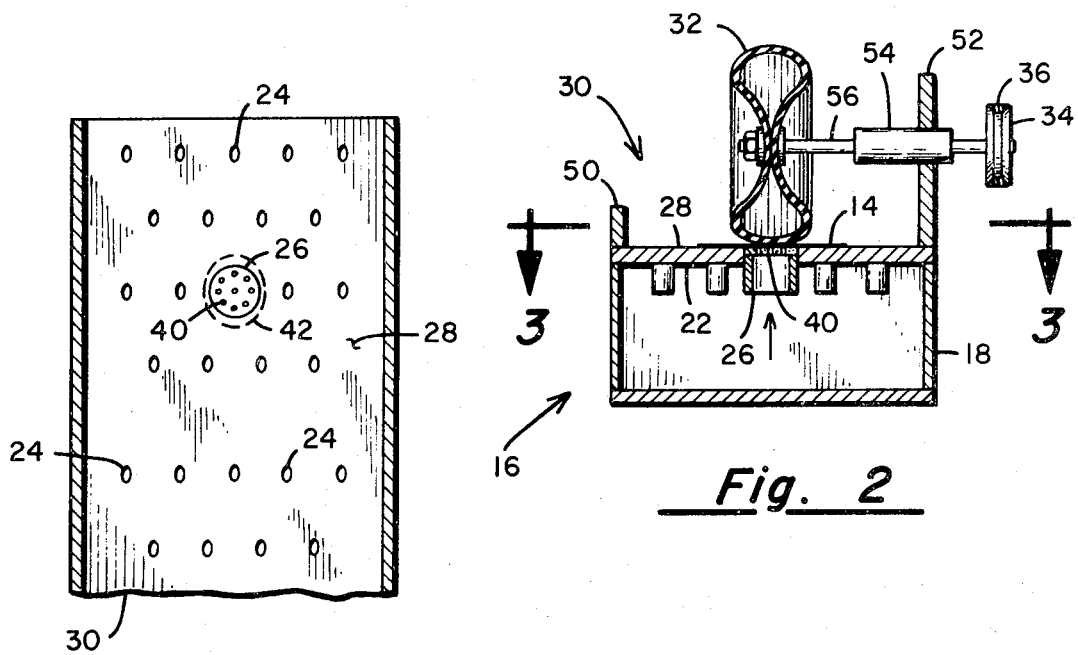
Fig. 3
Fig. 2
INVENTOR
DALE S. WORDEN
BY Kenneth S Grace
ATTORNEY 3,633,902

AIR-BEARING WHEEL ACCELERATOR FOR DOCUMENT-HANDLING APPARATUS

Background of the Invention

The present invention relates to a sheet-handling system and in particular to such a system in which a plurality of stacked sheets are singulated, or separated one at a time, and then are accelerated to the desired transport or conveying velocity for insertion into a sheet-handling apparatus such as that of the C. B. Albright U.S. Pat. No. 3,411,829. In such a system, in which the individual sheets are transported by a fluid such as due to controlled air jets, it is highly desirable to bring the singulated sheets into transport velocity in as short a distance as possible so as to shorten the handling time and transport path therefor.

Summary of the Invention

The present invention proposes the insertion of an accelerator immediately following the singulator for speedily accelerating the singulated sheets to transport velocity. The accelerator includes a low-pressure pneumatic tire suspended off a track along which the singulated sheet is transported. A jet of air immediately under the tire and emitted from ports in the document path impinges against the tire suspending it off the document path. A sheet, or document, interposd between the tire and the air jet is forced off the track against the tire periphery and is then by the peripheral velocity of the tire accelerated along the document path.

BRIEF DESCRIPTION OF THE DRAWINGS

FIG. 1 is an illustration of a side view of a portion of a sheet handling system in which the present invention is incorporated.

FIG. 2 is an illustration of a cross section of the accelerator assembly of FIG. 1 taken along line 2—2.

FIG. 3 is a cross section of the accelerator assembly of FIG. 2 taken along line 3—3.

DESCRIPTION OF THE PREFERRED EMBODIMENT

With particular reference to FIG. 1 there is presented an illustration of a front view of a portion of a sheet-handling system in which the present invention is incorporated. Singulator 10 is preferably a fluidic device such as that of the above referenced patent of C. B. Albright, which fluidically singulates the stack 12 of individual documents 14 passing the stream of the individual documents 14 into accelerator assembly 16. Accelerator assembly 16 includes plenum chamber 18 which is maintained at a positive air pressure by means of input tube 20 and which has a top member 22 through which a plurality of transport jets 24 and suspend jets 26 pass to the top surface 28 thereof which functions as the bottom surface of document tract 30. Transport jets 24, which may be similar to those of the R. S. Gluskin U.S. Pat. No. 3,437,335, serve to transport the documents along document track 30 by suspending documents 14 off the top surface 28 of document track 30 while suspend jets 26 normally suspend the bottom periphery of tire 32 off surface 28. The interposition of a document 14 between tire 32 and suspend jets 26 suspends document 14 off surface 28 against tire 32 causing the rotating tire 32 to accelerate document 14 downstream along document track 30 while suspended therefrom by transport jets 24. Tire 32 through its associated pulley 34 is driven by belt 36 and motor 38 to achieve a respective peripheral speed whereby the velocity of the singulated document 14 emitted from accelerator assembly 16 is in the order of 100 inches per second, such figure being illustrative only with no limitation thereto intended.

In operation, singulator 10 fluidically singulates the stack 12 of documents 14 passing the stream of individual documents 14 into accelerator assembly 16 upon the surface 28. Each document 14 is initially subjected to a series of transport jets 24 and thrust into the periphery of rotating tire 32 and thence carried into suspend jets 26. Suspend jets 26 are arranged under and are projected upon the bottom periphery of tire 32 through a plurality of ports 40, see FIG. 3, and normally suspend tire 32 off surface 28 as defined by outline 42. The interposition of document 14 between tire 32 and air jets 26 suspends document 14 off surface 28 against tire 32 causing the rotating tire 32 to accelerate document 14 downstream along document track 30 while suspended therefrom by jets 24.

With particular reference to FIG. 2 there is presented an illustration of a cross-sectional view of accelerator assembly 16 of FIG. 1 taken along line 2—2. FIG. 2 illustrates the plenum chamber 18 from which the positive air pressure from air jets 26 through a plurality of ports 40 are projected upon the under surface of document 14 against the bottom periphery of tire 32. Document track 30 may include side members 50, 52 upon which is secured a bushing 54 for securely rotatively coupling tire 32 to pulley 34 and belt 36 by means of drive shaft 56.

Tire 32 is preferably a soft periphery wheel, such as a pneumatic tire, suspended off surface 28 so as to normally provide a small area 42, see FIG. 3, of physical contact with surface 28. However, suspend jets 26 are constructed to deflect the bottom periphery of tire 32 for forming an air bearing between the bottom periphery of tire 32 and surface 28 so as to substantially eliminate any physical contact and resulting resistance therebetween. The construction of tire 32, its suspension off surface 28 and suspend jets 26 are all relative to each other and to the range of thickness and weight of the documents 14 that are to be accelerated. Suspend jets 26 pressure and port 40 construction and arrangement may provide proper control of document 14 size and weight variations.

With particular reference to FIG. 3 there is presented a sectional view of accelerator 16 taken along line 3—3 of FIG. 2. FIG. 3 is presented to illustrate a typical orientation of a series of transport jets 24 along surface 28 of document track 30. Additionally, there are illustrated the ports 40 in surface 28 associated with suspend jets 26 and their relationship with the outline 42 of the bottom periphery of tire 32.

What is claimed is:

1. An air-bearing wheel accelerator for a document handling apparatus, comprising:
    a document track for transporting a singulated document therealong;
    an accelerator for accelerating said singulated document along said document track, said accelerator including:
    a wheel having a soft periphery in physical contact with said document track;
    means for rotating said wheel at a peripheral velocity greater than the velocity of said singulated document;
    air suspension means in said document track for forming an air bearing between the bottom periphery of said wheel and said document track and eliminating any physical contact and resulting resistance therebetween.

2. An air-bearing wheel accelerator for a document handling apparatus, comprising:
    a document track having a plurality of transport air jets emitted therefrom for suspending and transporting a singulated stream of documents therealong;
    an accelerator for accelerating said singulated documents along said document track, said accelerator including:
    a soft periphery tire in physical contact with said document track;
    means for rotating said tire at a peripheral velocity greater than the velocity of said singulated documents;
    air suspension means in said document track for forming an air bearing between the periphery of said tire and said document track and normally suspending the periphery of said tire off said document track;
    said air suspension means suspending an interposed document off said document track and against the periphery of said rotating tire for enabling said rotating tire to accelerate said interposed document along said document track.